United States Patent Office 3,535,358
Patented Oct. 20, 1970

3,535,358
1,3-DISILYL-1,3,2,4-DIAZADISILETIDINES AND PROCESS
Walter Fink, Zurich, Switzerland, assignor to Monsanto Company, St. Louis, Mo., a corporation of Delaware
No Drawing. Continuation-in-part of applications Ser. No. 656,367, July 27, 1967, and Ser. No. 724,585, Apr. 28, 1968. This application Mar. 14, 1969, Ser. No. 807,441
Int. Cl. C07f 7/02
U.S. Cl. 260—448.2          19 Claims

ABSTRACT OF THE DISCLOSURE

The invention is a process for preparing 1,3-bis-disilyl-1,3,2,4-diazadisiletidines of the formula

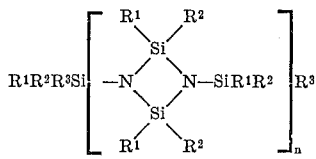

or

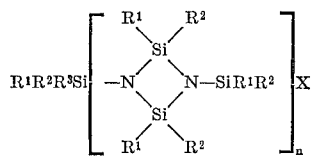

where X is a reactive halogen and $n$ is 1 to 100, by reacting a compound of the formula

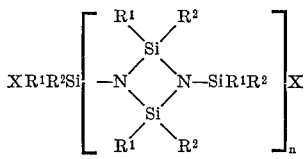

where X is a reactive halogen atom, and $NH_2$ group or a secondary or tertiary amino group, with a compound of the formula $MR^3$ where M is an alkali metal atom or MgX in halogen exchange, or a hydrogen linked via oxygen or nitrogen in the amine exchange process, and new compounds of the first or second formula above where $n$ is at least 2. These 1,3-bis disilyl-1,3,2,4-diazadisiletidines are useful as lubricants, oil additives, hydraulic oils and heat exchanger fluids.

---

This application is a continuation-in-part of copending applications Ser. No. 656,367, filed July 27, 1967, and Ser. No. 724,585, filed Apr. 28, 1968 both now abandoned.

The present invention relates to a process for preparing 1,3-disilyl-1,3,2,4-diazadisiletidines of the general formula (I)
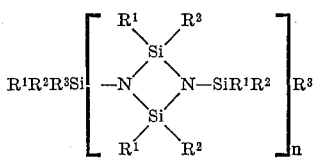

or

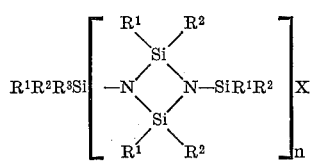

in which X is as defined hereinbelow, $R^1$, $R^2$ and $R^3$, taken singly, signify similar or different, possibly substituted and/or ethylenically or acetylenically unsaturated hydrocarbon groups, heterocyclic groups, or silyl groups, which may also be linked by an oxygen atom and the silyl groups also can be hydrogen atoms or fluorine atoms, $R^1$ and $R^2$, also can be hydrogen atoms o rfluorine atoms, $R^1$ and $R^2$, taken together with their silicon atom, a possibly substituted heterocyclic ring and $n$ an integer of 1 to 100. $R^1$, $R^2$, $R^3$ and R and R* referred to below normally will not have more than 24 carbon atoms and many times not more than 8 carbon atoms.

The compounds I are obtained on reacting a 1,3-disilyl-1,3,2,4-diazadisiletidine of the general formula (II)
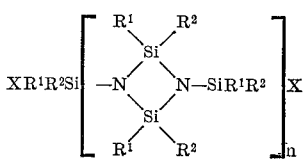

in which $R^1$, $R^2$ and $n$ are defined as before and X signifies a reactive halogen atom, an $H_2$ group, a secondary or tertiary amino group derived from an amine, which is more volatile than the hydroxyl compound, or aminosilane compound, respectively, to be reacted in the amine exchange process with a compound of the general formula (III)          $MR^3$ in which $R^3$ is defined as before and M represents, in the halogen exchange process, an alkali metal or MgX or, in the amine exchange process, a hydrogen atom linked to an oxygen atom or nitrogen atom, possibly in an inert solvent, until substantially no more alkali halide or magnesium halide, or ammonia or amine, respectively, is formed.

1,3 - disilyl - 1,3,2,4 - diazadisiletidines having organic groups which are linked through a carbon atom to the silicon atoms have been known. With the present invention, it is possible to prepare novel compounds from easily obtainable starting material. The process is especially suited for the preparation of compounds which show organic groups at the silicon atoms which are linked throuhg an oxygen atom. Such compounds may show high boiling points, that is a large liquid range, besides relatively low melting points. In comparison with analogous siloxanes the new compounds possess an appreciably greater thermal stability, as can be seen from the following data. The two compound A and B are compared.

(IV)
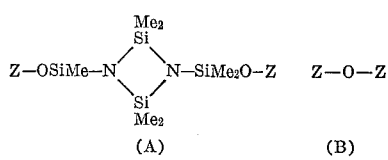

(A)          (B)

|  | Compound A | | Compound B | |
| --- | --- | --- | --- | --- |
| Z | Boiling point, ° C. | Temperature of decomposition, 1% per hour | Boiling point, ° C. | Temperature of decomposition, 1% per hour |
| Me₃Si— | 281 | >281 | 101 | |
| MePh₂Si— | 496 | 423 | 339 | 239 |
| Ph₃Si— | 524 | 418 | 484 | 388 |

Me, Ph=methyl, phenyl.

Different than the compounds which contain exclusively Si-O-Si groupings, the compounds of invention are able to neutralize acid impurities possibly appearing on using them, thereby a progressive decomposition is stopped. In alkaline medium, the new compounds are also hydrolytically substantially more stable as compared with, e.g, the silicones.

The starting compounds II with $n=1$ can be prepared by the process of copending application Ser. No. 625,309, filed Mar. 23, 1967, now abandoned, and Ser. No. 724,592, filed Apr. 26, 1968, which is there disclosed as reacting a cyclic silazane of the formula (V)          $(R^1R^2SiNH)_a$   ($a=3$ or 4)

e.g. hexamethylcyclotrisilazane, with a halosilane of the formula (VI)          $R^1R^2SiX_2$ in a molar proportion of $1:a$ in the presence of a hydrogen halide-binding agent, or on heating a linear silazane of the formula $XR^1R^2SiNHSiR^1R^2X$, e.g. 1,3-dichloro-tetramethyldisilazane in the presence of a hydrogen halide-binding agent.

The same starting compounds II, including those with $n>1$ can be prepared by the process disclosed and claimed in U.S. patent application No. 658,629, filed Aug. 7, 1967, by reacting the cyclosilazane formulated above and a halosilane in a molar proportion of at most $$1:\frac{a}{1.5}$$

without the presence of a hydrogen halide-binding agent. By this process there are obtained oligomeric to polymeric products having a higher and higher $n$, when the amount of halosilane is decreased, and thereby less and less monomeric product is formed. While with, e.g. hexamethylcyclotetrasilazane and halosilane in a proportion of 1:2 about 80% of monomeric product is formed, only about 10-15% are present at a proportion of 1:1.

Examples for organic groups are alkyls, alkenyls and alkynyls such as methyl, ethyl, vinyl, ethynyl, n-propyl, iso-propyl, allyl, propenyl, propargyl, propynyl, n-butyl, iso-butyl, sec-butyl, tert-butyl, methallyl, 1-butenyl, crotyl, butadienyl, 1-butynyl, 2-butynyl, 1-buten-2-ynyl and higher aliphatic groups such as undecenyl, dodecyl, myristyl, oleyl and tetracosyl; moreover, cycloalkyls, cycloalkenyls and cycloalkynyls such as cyclobutyl, cyclopentyl, cyclopentenyl, cyclopentadienyl, cyclohexyl, cyclohexenyl, cyclohexadienyl, cyclohexynyl, and greater alicyclic groups such as cyclooctyl, cyclododecyl, cyclooctatrienyl, cyclododecatrienyl and bicyclohexyl; moreover, aralkyls, aralkenyls and aralkynyls such as benzyl, cuminyl, phenylethyl, styryl, phenylethynyl, phenylpropyl, 3-phenylallyl, 2 - phenylallyl, cinnamyl, 1 - phenylpropynyl, 1-phenylpropargyl, diphenylmethyl, triphenylmethyl, α - naphthylmethyl, β - naphthylmethyl, 1 - (α - naphthyl)ethyl, 2-(α - naphthyl)ethyl, 1 - (β - naphthyl)ethyl, 2-(β-naphthyl)ethyl, 1 - (α - naphthyl)ethenyl, 2 - α - naphthyl) ethenyl, 1 - (β - naphthyl)ethenyl, 2 - (β - naphthyl)ethenyl, α - naphthylethynyl, and β - naphthylethynyl; moreover alkaryls, alkenylaryls and alkynylaryls such as tolyl, xylyl, mesityl, duryl, ethylphenyl, cumyl, vinylphenyl, ethylnylphenyl, propargylphenyl, propinylphenyl, tert-butylphenyl, α - vinylnaphthyl, β - vinylnaphthyl, α-ethynylnaphthyl and β - ethynylnaphthyl; moreover, aryls such as phenyl, o - biphenylyl, m - biphenylyl, p - biphenylyl, m - terphenylyl, p - terphenylyl, 1 - naphthyl, 2 - naphthyl, 2-anthryl, 9-anthryl, 1-phenanthryl, 2-phenanthryl, 3-phenanthryl, 4 - phenanthryl, 9 - phenanthryl, indanyl and indenyl; moreover, heterocyclic groups such as pyrryl, furyl, tetrahydrofuryl, benzofuryl, thienyl, pyrrolinyl, pyrrolidyl, pyrazolyl, pyrazolinyl, pyrazolidyl, imidazolyl, imidazolidyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, indolyl, phenazinyl, carbazolyl, etc.

These organic groups are furthermore denoted by an R. They can also be linked via an oxygen atom to their silicon atoms.

It has been found that the enumerated organic groups can also show substituents, insofar as they do not hinder the reaction of the invention.

For the groups $R^1$, $R^2$ and $R^3$ substituents should be considered which are found in the organic groups of halosilanes or cyclosilazanes. Examples are Cl, Br, I, F, OR, SR, CN, $NO_2$, $NR_2$ and silyl groups, where R is an organic group linked via a carbon atom, normally a hydrocarbon group.

Examples for some halogenated hydrocarbon groups are: chloromethyl, dichloromethyl, trichloromethyl, bromomethyl, dibromomethyl, tribromomethyl, fluoromethyl, difluoromethyl, trifluoromethyl, 1 - chloroethyl, 2-chloroethyl, 1 - bromoethyl, 2 - bromomethyl, 1 - fluoroethyl, 2 - fluoroethyl, 1,2 - dichloroethyl, 1,2 - difluoroethyl, 2 - trichloroethyl, 2 - trifluoroethyl, pentafluoroethyl, 2 - chlorovinyl, 1 - chlorovinyl, 1,2 - dichlorovinyl, trichlorovinyl, trifluorovinyl, bromophenyl, fluorophenyl, difluorophenyl, trifluorophenyl, pentafluorophenyl, trichloromethylphenyl and bis(trifluoromethyl)phenyl. Other hydrocarbon groups and heterocyclic groups than the above enumerated can also be halogenated in similar manner.

Examples for substituents of the formula OR and SR derive from the previously enumerated organic R groups.

Additional examples are substituents, which result from addition of formaldehyde, ethylene oxide or propylene oxide on a hydroxyl group and subsequent etherification, esterification or other blocking of the terminal hydroxyl groups. They correspond to the formulae $$-O(CH_2O)_bCH_2OT$$

$$-O(CH_2CH_2O)_bCH_2CH_2OT$$

$$-O(CH_2CH_2CH_2O)_bCH_2CH_2CH_2OT$$

(T=hydroxyl blocking group and as is customary in such chains, $b=1-10$).

Still further examples are substituents consisting of branched or straight-chain repeating ether groupings such as methoxymethylenoxy, 2 - methoxyethylenoxy, tert-butoxy - tert - butylenoxy, veratroxy, anisoxy, 3,4-dimethoxyphenenyloxy, 3 - phenoxy - 4 - methoxyphenenyloxy, etc., moreover, wholly aromatic ether groupings linked through an oxygen atom as they can be derived from the aromatic ethers enumerated later on can be used.

The alkoxy groups and aroxy groups can also be linked directly to a silicon atom because they can be an R group as well as OR according to the definition of $R^1$, $R^2$ and $R^3$ given at the beginning.

Examples of tertiary amino groups of the formula $NR_2$ are derived from the previously enumerated organic R groups. The two organic groups can be the same or different. Included are heterocyclic tertiary amino goups which are derived from a heterocyclic secondary amine such as ethylene imine, 1,2-propylene imine, 1,3-propylene imine, pyrrole, pyrroline, pyrrolidine, pyrazole, pyrazoline, N-methyl-pyrazolidine, imidazole, imidazoline, N-ethylimidazolidine, thiazolidine, oxazolidine, triazole, N,N'-dibutyltriazolidine, piperidine, N-dodecylpiperazine, morpholine, thiazine, indole, carbazole, phenoxazine, etc.

Examples for nitrated and cyanated groups of the formula $RNO_2$ and RCN are derived again from the previously enumerated organic R groups. The nitro group or cyano group can be present more than once.

The groups $R^1$, $R^2$ and $R^3$ can also be silyl groups. The term "silyl groups" is understood in its largest sense and comprises at least the groupings $SiR^*_3$, $SiR^*_2SiR^*_3$, $SiR^*_2OSiR^*_3$, $Si(SiR^*)_2R^*$, $Si(OSiR^*_3)_2R^*$, $Si(SiR^*_3)_3$ and $Si(OSiR^*_3)_3$ ($R^*$=hydrogen atom, fluorine atom and/or organic group, possibly linked through an oxygen atom).

Examples for some silyl groups of the formula $SiR_3$ and $Si(OR)_3$ are trimethylsilyl, triphenylsilyl, trimethoxysilyl, triphenoxysilyl, methyl-diphenylsilyl, dimethyl-phenylsilyl, methoxy-diphenoxysilyl, dimethoxy-phenoxysilyl, methyl-dimethoxysilyl, dimethyl-methoxysilyl, phenyl-dimethoxysilyl, diphenyl-dimethoxysilyl, methyl-diphenoxysilyl, dimethyl - phenoxysilyl, phenyl - dimethoxysilyl, diphenylmethoxysilyl, methyl-phenyl-methoxysilyl, methyl-phenyl-phenoxysilyl, etc.; included are silyl groups in which Si is a constituent of a heterocyclic ring such as in the groups 1-silacyclobutyl, 1-silacyclopentyl, 1-silacyclopentenyl, 1-silacyclohexyl, 1-silacyclohexenyl, 1-silacyclohexadienyl, etc.

Examples for silyl groups of the formula $SiF_3$, $SiF_2R$, $SiF_2OR$, $SiFR_2$ and $CiF(OR)_2$ are trifluorosilyl, methyl-difluorosilyl, dimethyl-fluorosilyl, phenyl-difluorosilyl, diphenyl-fluorosilyl, methyl-phenyl-fluorosilyl, methoxy-difluorosilyl, dimethoxy-fluorosilyl, phenoxy-difluorosilyl, diphenoxy-fluorosilyl, methoxy-phenoxy-fluorosilyl, methyl-phenoxy-fluorosilyl, phenyl-methoxy-fluorosilyl, etc.

Examples for silyl groups of the formula $SiH_3$, $SiH_2R$, $SiH_2OR$, $SiHR_2$, $SiH(OR)_2$, $Si(OR)HF$ and $SiHFR$ are trihydrogenosilyl, methyl-dihydrogenosilyl, dimethyl-hydrogenosilyl, phenyl-dihydrogenosilyl, diphenyl-hydrogenosilyl, methyl-phenyl-hydrogenosilyl, methoxy-dihydrogenosilyl, dimethoxy-hydrogenosilyl, phenoxy-dihydrogenosilyl, diphenoxy-hydrogenosilyl, methoxy-phenoxy-hydrogenosilyl, methoxy-phenyl-hydrogenosilyl, phenyl-fluoro-hydrogenosilyl, etc.

The simplest representatives of the substituents with Si—Si- or Si—O—Si- bindings are pentamethyldisilanyl, 1-trimethylsilyl-tetramethyldisilanyl, 1-bis(trimethylsilyl)-trimethyldisilanyl, pentamethoxydisilanyl, pentamethoxydisiloxanyl, 1-trimethoxysilyl-tetramethoxydisiloxanyl and 1-bis(trimethoxysilyl)-trimethoxydisiloxanyl.

Analogous substituents contain, possibly partly, other organic R groups, hydrogen atoms or fluorine atoms instead of methyl.

To those skilled in the art it is clear that silyl groups, especially those with two or more silicon atoms, as a rule do not contain exclusively fluorine atoms or hydrogen atoms, but more probably a combination with organic R groups.

The cited silyl groups, disilanyl groups and disiloxanyl groups can also be attached through an oxygen atom to the silicon atom of the cyclodisilazane ring because, according to the definition of $R^1$, $R^2$ and $R^3$ set forth at the beginning, these can be an $SiR^*_3$ group, as well as an $OSiR^*_3$ group or

group.

Some simple representatives of silyl groups linked through a nitrogen atom are: trifluorosilylamino, trifluorosilylmethylamino, bis(trimethylsilyl)amino, trimethoxysilylamino, trimethoxysilylmethylamino, bis(trimethoxysilyl)amino, triphenylsilylamino, methyl-diphenylsilylamino, bis(dimethylphenylsilyl)-amino, pentamethyldisilanylamino, pentamethyldisilazanylamino, pentamethyldisiloxanylamino, pentamethoxydisilanylamino, pentamethoxydisilazanylamino and pentamethoxydisiloxanylamino.

Additional substituents containing nitrogen and silicon may be expressed by the formula $—Si(R^*)_2—NH—SiR^*_3$ and

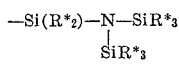

Moreover, the mentioned silyl groups may also be present as substituents in organic groups and in such cases they are attached, possibly through an oxygen atom or nitrogen atom, via one or several carbon atoms to the silicon atoms of the cyclodisilazane ring.

All named substituents generally are attached to lower alkyls, alkenyls, or alkynyls having 1 to 5 carbon atoms or to a phenyl. They can, however, also be present on higher aliphatic, cycloaliphatic, araliphatic and polynuclear aromatic groups. It should be pointed out that the enumerated substituents can be located with respect to the silicon atom as well as also to each other in ortho position, meta position or para position.

Especially valuable products which are distinguished by their great thermal and hydrolytic stability and which have a broad liquid range or intermediate products, respectively, which are suited for the preparation of such products contain at least a diarylether grouping [ArOAr] which is derived from one of the following compounds: phenoxybenzene, toloxybenzene, 2-biphenylether, 3-biphenylether, 4-biphenylether, 2-biphenylyl-4-biphenylylether, 3-biphenylyl-4-biphenylylether, 1-(2-biphenylyloxy)-4-phenoxybenzene, 1-(3-biphenylyloxy)-2-phenoxybenzene, 1-(3-biphenylyloxy)-3-phenoxybenzene, 1-(3-biphenylyloxy)-4-phenoxybenzene, 1-(4-biphenylyloxy)-2-phenoxybenzene, 1-(4-biphenylyloxy)-3-phenoxybenzene, 1-(4-biphenylyloxy)-4-phenoxybenzene, 2,2'-diphenoxybiphenyl, 3,3'-diphenoxybiphenyl, 4,4'-diphenoxybiphenyl, 2,3'-diphenoxybiphenyl, 2,4'-diphenoxybiphenyl, 3,4'-diphenoxybiphenyl, 2,4 - diphenoxybiphenyl, 2,5 - diphenoxybiphenyl, 2,6 - diphenoxybiphenyl, 3,4 - diphenoxybiphenyl, 3,5-diphenoxybiphenyl, 1,2,3-triphenoxybenzene, 1,2,4-triphenoxybenzene, 1,3,5-triphenoxybenzene, 2-phenoxyphenylether, 3-phenoxyphenylether, 4-phenoxyphenylether, 2-phenoxyphenyl-3-phenoxyphenylether, 2-phenoxy-4'-phenoxyphenylether, 3-phenoxyphenyl-4'-phenoxyphenylether, 1-phenoxynaphthalene, 2-phenoxynaphthalene, 1,1'-dinaphthalene ether, 2,2'-dinaphthalene ether, 1,2'-dinaphthalene ether, etc.; moreover, longer chain polyaroxyaryls of the formula $ArO(ArO)_b$ are suitable in which Ar represents a phenyl groups, biphenylyl group or naphthyl group, or a phenylene, biphenylylene or naphthylylene or naphthylene group which can have lower alkyls as substituents and where $b$ is defined as before.

The enumerated aromatic ethers can be linked through one of their carbon atoms or through an additional oxygen atom with the silicon atom. Moreover, one to several hydrogen atoms can be replaced by fluorine atoms, thereby the liquid range of the end products can be increased.

On reacting the reaction partners II and III, two different cases, that is the halogen exchange process and the amine exchange process have to be distinguished.

In the halogen exchange process the starting compound II contains two exchangeable halogen atoms. As a rule, these are chlorine atoms or bromine atoms. Iodine atoms are scarcely used and fluorine atoms are, as a rule, not at all or only difficultly exchangeable. Examples for the simplest organic starting compounds II are 1,3-bis-(dimethylchlorosilyl) - 2,2,4,4 - tetramethyl - 1,3,2,4-tetramethyl - 1,3,2,4 - diazadisiletidine 1,3 - bis - (diphenylchlorosilyl) - 2,2,4,4 - tetraphenyl - 1,3,2,4 - diazadisiletidine and 1,3 - bis - [1-chloro-silacyclopentyl-(1)]-2,4-bis-(tetramethylene)-1,3,2,4-diazadisiletidine.

Alkali metal compounds III are, e.g. alkali hydrocarbyl compounds such as sodium phenyl, sodium diphenylmethyl, sodium bis-trimethylsilyl-methyl, sodium bis-trimethoxysilyl - methyl, etc., alkali alcoholates or alkali phenolates such as sodium methanolate, sodium cresolate, etc., alkali silanes such as sodium triphenylsilyl, sodium triphenoxysilyl, sodium - 1 - trimethylsilylnaphthyl, etc., alkali silylamides such as sodium trimethylsilylamide, sodium bis - dimethylphenylsilyl - amide, sodium triphenylsilyl - methylamide, etc., and alkali silanolates such as sodium trimethylsilanolate, sodium triphenylsilanolate, sodium trimethoxysilanolate, sodium triphenoxysilanolate, etc. Potassium or lithium can be substituted for sodium. Moreover, the halogen exchange process can be achieved with any Grignard compounds (organomagnesium halides).

By the halogen exchange process, preferably groups from an alcohol, phenol, or silanol are introduced. These reactions are, in principle, known and the usual working methods may also be applied to the process of invention. Simply summarizing, the reaction components are heated, possibly in an inert solvent, as long as it is necessary to make the separation of the alkali halide practically complete.

In the amine exchange process the starting compound II contains two exchangeable amino groups. The preparation of the aminated starting compound is achieved on exchanging the halogen atom for amino groups. This reaction is, in principle, also known and the usual working methods can be applied.

Summarizing simply, a 1,3-bis-(chlorosilyl)-1,3,2,4-diazadisiletidine corresponding to the Formula II, where X=Cl or Br, is brought to reaction, possibly in an inert solvent, with an amine or ammonia using a quantity which is at least sufficient for the replacement and binding of the hydrogen halide and, if necessary, is heated until the separation of the amine salt or ammonium salt, respectively, is complete. The reaction with amines which are only weakly basic can expediently be carried out in the presence of a stronger basic tertiary amine such as triethylamine. In the starting compounds II obtained in this manner, X therefore represents an amino group, preferably a tertiary amino group, attached through its nitrogen atom. The simplest wholly organic representative is 1,3 - bis-(dimethyl-dimethyl-aminosilyl)-2,2,4,4-tetramethyl-1,3,2,4-diazadisiletidine.

In principle, the reaction with ammonia or primary amines is also feasible. However, it leads easily to side reactions.

The preparation of the compounds II, where X=amino, and their conversion to the desired end products can also be combined, i.e. the intermediate product II does not have to be isolated.

The amine exchange process can best be carried out using starting compounds whose amino groups are derived from a low boiling secondary amine such as dimethylamine or diethylamine. It is desirable in each case that the amines split off show a lower boiling point than the hydroxyl compounds and aminosilane compounds to be reacted. In order to obtain the amine exchange it is sufficient to heat the reaction components, possibly in an inert solvent, until the cleavage of the amine is complete. If ammonia or an easily volatile amine (e.g. methylamine, dimethylamine, ethylamine or diethylamine) is to be split off, the reaction proceeds rather quickly at about 50 to 150° C.

On reacting aminosilanes, preferably those are used which have on the nitrogen atom besides the silyl group, a hydrocarbon group such as, e.g. the compounds

HN(Me)SiR₃ and NH(PH)SiR₃.

While the choice of substituted group R¹ and R² introduced by the halosilane VI is subject to a certain limitation because of difficulties in the preparation of the starting compounds II having X=Cl or Br, many more kinds of substituents can be present in the R³ group which is introduced subsequently by halogen exchange or amine exchange.

Besides the substituents already cited for R¹ and R², the following additional ones are considered for R³:
—COR, —CSR, —COOR, —COSR, —CSOR, —CSSR, —OCOR, —SCOR, —SCSR, —CONR₂, —N(R)COR, —N(R)COOR, —N(R)CONR₂, —N=NR, =NR, —N=NCR₂, —SOR, —SO₂R, —SO₂OR, —SO₂NR₂, —N(R)SO₂R and —N(R)SO₂OR (R is defined as before).

Examples for some acyl substituents showing the general formula —COR are: acetyl, n-propionyl, iso-propionyl, acrylyl, crotonyl, propiolyl, n-butyryl, iso-butyryl, valeryl, pivalyl, enanthyl, caprylyl lauroyl, myristoyl, oleoyl, stearoyl, phenylacetyl, diphenylacetyl, cinnamoyl, benzoyl, naphthoyl, cumoyl, 4-biphenylyl-carbonyl, anisoyl, phenetoyl, veratroyl, 2,3,4-, 1,4,5- and 3,4,5-trimethoxybenzoyl, p-diphenylaminobenzoyl, cyanacetyl, trimethylsilylanthranoyl, methoxyacetyl, dimethylaminoacetyl, trimethylsilylaminoacetyl, bis(triphenylsilyl)-aminoacetyl, trimethylsiloxyacetyl, trichloroacetyl, trifluoroacetyl, 2-furoyl, 3-furoyl, pyrroyl, including the thio analogues corresponding to the general formula —CSR.

Examples for sulfinyl substituents and sulfonyl substituents are those groups which have an —SO— group or an —SO₂— group instead of the —CO— group shown in the above-mentioned formula and therefore correspond to the general formula —SOR and —SO₂R. They can occur more than once in the same hydrocarbon group as well as can the carbonyl groups.

Examples for some ester substituents which show the general formula —COOR, are: carbomethoxy, carbethoxy, carbovinyloxy, carbo-n-propoxy, carbo-2-propenoxy, carbo-iso-propenoxy, carboctoxy, carbundecylenoxy, carboctadecoxy, carbophenoxy, including the thio analogues corresponding to the general formula —COSR, —CSOR and —CSSR.

Examples for related sulfonic acid ester substituents are those groups which possess an —SO₂— group instead of the —CO— group shown in the formula above and therefore correspond to the formula —SO₂OR.

The enumerated carboxylic ester groups and sulfonic ester groups can also be linked through a nitrogen atom and represent in the first case a urethane group corresponding to the general formula —N(R)COOR. Included are the analogous groups of thiourethanes. In the second case they represent a sulfamide group and can therefore be expressed by the general formula —N(R)SO₂OR.

Examples for another class of ester substituents corresponding to the general formula —OCOR, are: acetoxy, acrylyloxy, n-propionyloxy, crotonyloxy, propiolyloxy, tetrolyloxy, n-butyryloxy, valeryloxy, caproyloxy, caprylyloxy, pelargonyloxy, phenylacrylyloxy, benzoxy, capryloxy, lauroyloxy, palmitoyloxy, cumoyloxy, phenylacetoxy, including the thio analogues which show the general formula —SCOR, —OCSR and —SCSR.

The esters of dicarboxylic acids, e.g. the ethyl esters of oxalic acid, malonic acid, succinic acid, maleic acid, fumaric acid, adipic acid, phthalic acid, etc., can also be used as substituents.

Examples for another class of ester substituents are those groups which possess an —SO₂—group instead of the —CO— group shown in the formula above and therefore correspond to the general formula —OSO₂R.

Examples for some carbamyl substituents which show the general formula —CONR₂, are the unsubstituted carbamyl groups and organically substituted carbamyl groups such as methylcarbamyl, ethylcarbamyl, allylcarbamyl, n - propylcarbamyl, iso - propylcarbamyl, iso-propenylcarbamyl, n-butylcarbamyl, sec-butylcarbamyl, 3-n-butenylcarbamyl, myristylcarbamyl, cyclohexylcarbamyl, phenylcarbamyl, triethylsilylcarbamyl, dimethyl - phenylsilylcarbamyl, triphenylsilylcarbamyl, including the disubstituted carbamyl groups.

Examples for some amido substituents having the general formula —N(R)COR, are: acetamido, chloroacetamido, trifluoroacetamido, benzamido, cyanobenzamido, iso-propionylamido, n-butyrylamido, valerylamido, palmitoylamido, tetracosanoylamido, naphthoylamido, including the related imido substituents such as phthalimido, pyromellitimido, etc.

Examples for the sulfonamido substituents are those groups which possess an —SO₂— group instead of the —CO— group shown in the formula above and therefore correspond to the general formula —N(R)SO₂R.

Examples for some azo substituents which possess the general formula —N=NR″, are: methylazo, ethylazo, n-butylazo, isobutylazo, tert-butylazo, phenylazo, N-phenyl-phenylene-bis-azo.

Examples for some azino substituents, which possess the general formula =N—N=CR₂, are: acetaldehydazino, acetonazino, hexafluoroacetonazino, benzaldehydazino, acetophenonazino, 2,4' - dichloroacetophenonazino, benzophenonazino, 4,4' - bis(N - trimethylsilyl-methylamino)-benzophenonazino.

Examples for some alkylidenamino substituents, which possess the general formula —N=CR₂, are methylenamino, ethylidenamino, 2-trifluoroethylidenamino, vinylidenamino, n - propylidenamino, 1 - ethylbutylidenamino, 3-butenylidenamino, benzylidenamino, alpha-methylbenzylidenamino, alpha - phenylbenzylidenamino, cinnamylidenamino.

Examples for some imino substituents which possess the general formula =NR, are the organically substituted imino groups such as methylimino, iso-butylimino, sec-butylimino, allylimino, cycloheptylimino, phenylethylimino, anisylimino, p-dimethylaminophenylenimino, pentafluorophenylimino, etc.

The monomeric to oligomeric 1,3-disilyl-1,3,2,4-diazadisiletidines (N,N'-disilyl-cyclodisilazanes) obtained in the described manner on exchanging the halogen atoms for organic groups or silyl groups are, in general, exceedingly temperature resistant compounds. They are also very stable towards hydrolysis. Depending on the organic substituents present, they are liquid, fatty, waxy, gummy or resinous masses. They are useful as lubricants, oil additives, hydraulic oils, heat exchanger fluids and for similar purposes, where high temperature resistant materials are desired or necessary.

They can also be useful as stabilizers to hinder acid-catalyzed degradation reactions and as curing agents for many synthetic resins, e.g. epoxy resins.

The products having unsaturated substituents on the silicon atoms are very valuable intermediate products because they can be subjected to addition reactions and polymerization reactions.

EXAMPLE 1

8.3 g. (0.025 mole) of 1,3-bis(dimethylchlorosilyl)-2,2,4,4-tetramethyl-1,3,2,4-diazadisiletidine and 11.8 g. (0.05 mole) of sodium diphenylmethylsilanolate in 80 ml. xylol are refluxed for 3 hours. The precipitated sodium chloride is filtered off and the solvent removed. The residue is fractionally distilled in the vacuum. Yield 11.2 g. (67%) of 1,3 - bis - (diphenylmethylsiloxy - dimethylsilyl) - 2,2,4,4-tetramethyl-1,3,2,4-diazadisiletidine; B.P. 225° C./0.01 mm.; $n_D^{20}$ 1.5338.

Analysis.—Calc'd for $C_{34}H_{50}O_2N_2Si_6$ (percent): C, 59.41; H, 7.33; N, 4.08; mol. weight 687.3. Found (percent): C, 59.32; H, 7.41; N, 4.29; mol. weight 659 (in benzene).

EXAMPLE 2

16.2 g. (0.05 mole) of 1,3-bis-(dimethylchlorosilyl)-2,2,4,4-tetramethyl-1,3,2,4-diazadisiletidine and 13.2 g. (0.1 mole) of sodium trimethylsilanolate in 70 ml. xylol are refluxed for 3 hours. The product is worked up as in Example 1. Yield 17.2 g. (78.4%) of 1,3-bis-(trimethylsiloxy-dimethylsilyl)-2,2,4,4-tetramethyl - 1,3,2,4-diazadisiletidine; M.P. 12° C., B.P. 105° C./mm.; $n_D^{20}$ 1.4227.

Analysis.—Calc'd for $C_{14}H_{42}O_2N_2Si_6$ (percent): C, 38.30; H, 9.64; N, 6.38; mol. weight 439.0. Found (percent): C, 38.32; H, 9.59; N, 6.41; mol. weight 410 (in benzene).

EXAMPLE 3

8.3 g. (0.025 mole) of 1,3-bis-(dimethylchlorosilyl)-2,2,4,4-tetramethyl-1,3,2,4-diazadisiletidine and 14.9 g. (0.05 mole) of sodium triphenylsilanolate in 120 ml. xylol are refluxed for 4–5 hours. The separated sodium chloride is filtered off and the solvent removed. The residue is recrytallized from cyclohexane. Yield 17.3 g. (85.3%) of 1,3-bis-(triphenylsiolxy-dimethylsilyl)-2,2,4,4-tetramethyl-1,3,2,4-diazadisiletidine; M.P. 189–191° C.

Analysis.—Calc'd for $C_{44}H_{54}O_2N_2Si_6$ (percent): C, 65.13; H, 6.71; N, 3.45; mol. weight 811.5. Found (percent): C, 65.38; H, 6.55; N, 3.55; mol. weight 793 (in benzene).

EXAMPLE 4

To a suspension of 0.2 mole sodiumphenyl in 150 ml. of toluene (obtained from 9.2 g. (0.4 mole) of sodium and 22.5 g. (0.2 mole) of chlorobenzene) are added 33.1 g. (0.1 mole) of 1,3-bis-(dimethylchlorosilyl)-2,2,4,4-tetramethyl-1,3,2,4-diazadisiletidine in 20 ml. of toluene. The temperature of the stirred mixture does not exceed 40° in 24 hours. Then the mixture is refluxed for another 2 hours. The separated sodium chloride is filtered off and the solvent removed. The residue is fractionally distilled. Yield 30.2 g. (72.8%) of 1,3-bis-(phenyl-dimethylsilyl)-2,2,4,4-tetramethyl - 1,3,2,4-diazadisiletidine; B.P. 130–133° C./0.03 mm.; M.P. 61–62° C. (from petroleum ether).

Analysis.—Calc'd for $C_{20}H_{34}N_2Si_4$ (percent): C, 57.90; H, 8.26; N, 6.75; mol. weight 414.9. Found (percent): C, 57.53; H, 8.01; N, 6.73; mol. weight 390 (in benzene).

EXAMPLE 5

0.2 mole of sodiumphenyl are reacted with 66.2 g. (0.2 mole) of 1,3-bis-(dimethylchlorosilyl)-2,2,4,4-tetramethyl-1,3,2,4-diazadisiletidine as described in Example 4. Yield 50.4 g. (63.5%) of 1-phenyl-dimethylsilyl-3-chloro-dimethylsilyl-2,2,4,4 - tetramethyl-1,3,2,4-diazadisiletidine; B.P. 104° C./0.05 mm.; $n_D^{20}$ 1.4892.

Analysis.—Calc'd for $C_{14}H_{29}NSi_4Cl$ (percent): C, 45.05; H, 7.83; N, 7.51; Cl, 9.50; mol. weight 373.2. Found (percent): C, 45.32; H, 7.77; N, 7.63; Cl, 8.24; mol. weight 339 (in benzene).

EXAMPLE 6

To a suspension of 0.104 mole 4-sodiumbiphenyl (obtained from 4.8 g. (0.209 mole) of sodium and 44.3 g. (0.104 mole) of bromobiphenylyl in 120 ml. of toluene) are added 34.6 g. (0.104 mole) of 1,3-bis-(dimethylchlorosilyl)-2,2,4,4-tetramethyl - 1,3,2,4-diazadisiletidine in 20 ml. of toluene and the mixture is stirred at 35–40° C. for 12 hours. The mixture becomes jelly-like. Another 300 ml. of toluene are added and the mixture is worked up as before. Yield 24.3 g. (51.9%) of 1-dimethylchlorosilyl-3-biphenylyl-dimethylsilyl - 2,2,4,4-tetramethyl-1,3,2,4-diazadisiletidine; B.P. 165° C./0.005 mm.; the oily, slightly yellow compound crystallizes on standing; M.P. 48–50° C.

Analysis.—Calc'd for $C_{20}H_{33}N_2ClSi_4$ (percent): C, 53.46; H, 7.40; N, 6.23; Cl, 7.89; mol. weight 449.3. Found (percent): C, 53.22; H, 7.31; N, 6.12; Cl, 6.95; mol. weight 431 (in benzene).

EXAMPLE 7

To a solution of 286–429 g. (2.4–3.6 mol) of methyl magnesium bromide in diethyl ether are added 198.9 g. (0.6 mol) of 1,3-bis-(dimethylchlorosilyl)-2,2,4,4-tetramethyl-1,3,2,4-diazadisiletidine dissolved in 150–200 ml. of diethyl ether, the mixture was stirred at room temperature for 20 hours and subsequently refluxed for 4–5 hours. Then, by addition of trimethylchlorosilane, the excess of Grignard compound is inactivated and after cooling the mixture, the magnesium salts are separated by extensive distillation of the ether, taking up the residue in hexane and filtration. The purification is achieved by distillation through a spinning band column. Yield 149.5 g. (85.6%) of 1,3-bis-(trimethylsilyl)-2,2,4,4 - tetramethyl-1,3,2,4-diazadisiletidine; M.P. 39° C./B.P. 85° C./7 mm.; $n_D^{45}$ 1.4237.

Analysis.—Calc'd for $C_{10}H_{30}N_2Si_4$ (percent): C, 41.37; H, 10.40; N, 9.65; mol. weight 290.7. Found (percent): C, 41.70; H, 10.48; N, 9.57; mol. weight 294.

and 12.1 g. of 1-trimethylsilyl-3-dimethylchlorosilyl-2,2,4,4-tetramethyl-1,3,2,4-diazadisiletidine; M.P. 53° C.; B.P. 103° C./12 mm.

Analysis.—Calc'd for $C_9H_{27}ClN_2Si_4$ (percent): C, 34.74; H, 8.75; Cl, 11.4; N, 9.00; mol. weight 311.1. Found (percent): C, 34.58; H, 8.74; Cl, 11.6; N, 9.05; mol. weight 315.

EXAMPLE 8

One proceeds as in Example 7. There are obtained from 62.9 g. (0.12 mole) of bis-(3-dimethylchlorosilyl-2,2,4,4-tetramethyl-1,3,2,4 - diazadisiletidino) - dimethylsilane and 57.2–85.8 g. (0.48–0.72 mole) of methyl magnesium bromide 47.1 g. (81.2%) of totally methylated compound; M.P. 20° C.; B.P. 104° C./0.005 mm.; $n_D^{20}$ 1.4553.

*Analysis.*—Calc'd for $C_{16}H_{48}N_4Si_7$ (percent): C, 38.96; H, 9.81; N, 11.36; mol. weight 493.2. Found (percent): C, 38.78; H, 9.80; N, 11.43; mol. weight 481.

and 5.2 g. of half-methylated compound; M.P. 28° C.; B.P. 120° C./0.005 mm.

*Analysis.*—Calc'd for $C_{15}H_{45}ClN_4Si_7$ (percent): C, 35.08; H, 8.83; Cl, 6.93; N, 10.91; mol. weight 513.6. Found (percent): C, 35.34; H, 8.69; Cl, 6.82; N, 10.82; mol. weight 495.

EXAMPLE 9

One proceeds as in Example 7. There are obtained from 73.7 g. (0.1 mole) of 1,3-bis-(3'-dimethylchlorosilyl - 2',2',4',4'-tetramethyl - 1',3',2',4' - diazadisiletidino - dimethylsilyl) - 2,2,4,4 - tetramethyl - 1, 3,2,4 - diazadisiletidine and 47.7–71.5 g. (0.4–0.6 mole) of methyl magnesium bromide 57.6 g. (83%) of totally methylated compound; MP. 100° C.; B.P. 163° C./0.005 mm.

*Analysis.*—Calc'd for $C_{22}H_{66}N_6Si_{10}$ (percent): C, 37.98; H, 9.56; N, 12.08; mol. weight 695.7. Found (percent): C, 38.05; H, 9.51; N, 12.38; mol. weight 688.

EXAMPLE 10

One proceeds as in Example 4. There are obtained from 21.4 g. (0.04 mole) of bis-(3-dimethylchlorosilyl-2, 2,4,4, - tetramethyl - 1,3,2,4 - diazadisiletidino) - dimethylsilane and 0.08 mol of sodium phenyl 14.3 g. (59%) of totally phenylated compound; B.P. 185° C./0.005 mm.; $n_D^{20}$ 1.5093.

*Analysis.*—Calc'd for $C_{26}H_{52}N_4Si_7$ (percent): C, 50.58; H, 8.49; N, 9.08; mol. weight 617.4. Found (percent): C, 50.35; H, 8.60; N, 9.15; mol. weight 596.

EXAMPLE 11

One proceeds as in Example 4. There are obtained from 22.1 g. (0.03 mol) of 1,3-bis-(3'-dimethylchlorosilyl-2',2', 4',4' - tetramethyl - 1',3',2',4' - diazadisiletidino-dimethylsilyl) - 2,2,4,4 - tetramethyl - 1,3,2,4 - diazadisiletidine and 0.06 mol of sodium phenyl 12.3 g. (50%) of totally phenylated compound; B.P. 275° C./0.02 mm.; $n_D^{50}$ 1.535.

*Analysis.*—Calc'd for $C_{32}H_{70}N_6Si_{10}$ (percent): C, 46.88; H, 8.61; N, 10.25; mol. weight 819.9. Found (percent): C, 46.99; H, 8.35; N, 10.13; mol. weight 793.

EXAMPLE 12

One proceeds as in Example 1. There are obtained from 26.7 g. (0.05 mol) of bis - (3-dimethylchlorosilyl-2,2,4,4-tetramethyl - 1,3,2,4 - diazadisiletidino) - dimethylsilane and 11.2 g. (0.1 mol) of sodium trimethylsilanolate 21.9 g. (68.5%) of bis - (3 - trimethylsiloxy - dimethylsilyl - 2,2,4,4 - tetramethyl - 1,3,2,4-diazadisiletidino)-dimethylsilane; B.P. 146° C./0.005 mm.; M.P. 3° C.; $n_D^{20}$ 1.4425.

*Analysis.*—Calc'd for $C_{20}H_{60}O_2N_4Si_9$ (percent): C, 37.44; H, 9.43; N, 8.73; mol. weight 641.5. Found (percent): C, 37.79; H, 9.23; N, 9.18; mol. weight 621.

EXAMPLE 13

One proceeds as in Example 1. There are obtained from 27.2 g. (0.027 mol) of 1,3-bis(3'-dimethylchlorosilyl-2',2', 4',4' - tetramethyl - 1',3',2',4' - diazadisiletidino-dimethylsilyl) - 2,2,4,4 - tetramethyl-1,3,2,4 - diazadisiletidine and 6.0 g. (0.054 mol) of sodium trimethylsilanolate 20.4 g. (89%) of 1,3 - bis(3'-trimethylsiloxy-dimethyl-silyl-2',2', 4',4' - tetramethyl - 1',3',2',4' - diazadisiletidino-dimethyl-silyl) - 2,2,4,4 - tetramethyl - 1,3,2,4 - diazadisiletidine; B.P. 205° C./0.01 mm.; M.P. 18° C.; $n_D^{20}$ 1.4581.

*Analysis.*—Cal'cd. for $C_{26}H_{78}O_2N_6Si_{12}$ (percent): C, 37.00; H, 9.31; N, 9.96; mol. weight 844. Found (percent): C, 36.98; H, 9.22; N, 10.03; mol. weight 817.

EXAMPLE 14

One proceeds as in Example 1. There are obtained from 25.1 g. 0.047 mol) of bis - (3-dimethylchlorosilyl)-2,2,4,4 - tetramethyl - 1,3,2,4-diazadisiletidino)-dimethylsilane and 22.5 g. (0.095 mol) of sodium methyldiphenylsilanolate 28.6 g. (68.5%) of bis-3-methyldiphenylsiloxydimethylsilyl - 2,2,4,4 - tetramethyl - 1,3,2,4 - diazadisiletidino)-dimethylsilane; B.P. 274° C./0.001 mm.; M.P. 39° C.; $n_D^{20}$ 1.5219.

*Analysis.*—Calc'd for $C_{40}H_{68}O_2N_4Si_9$ (percent): C, 53.99; H, 7.70; N, 6.30; mol. weight 889.8. Found (percent): C, 54.44; H, 7.40; N, 6.81; mol. weight 863.

EXAMPLE 15

One proceeds as in Example 3. There are obtained from 13.4 g. (0.025 mol) of bis-(3-dimethylchlorosilyl-2,2,4,4 - tetramethyl - 1,3,2,4 - diazadisiletidino) - dimethylsilane and 14.9 g. (0.05 mol) of sodium triphenylsilanolate 16.6 g. (65.4%) of bis-3-triphenylsiloxy-dimethylsilyl - 2,2,4,4 - tetramethyl - 1,3,2,4 - diazadisiletidino) - dimethylsilane; B.P. 320–330° C./0.002 mm.; softening point 95° C.

*Analysis.*—Calc'd for $C_{50}H_{72}O_2N_4Si_9$ (percent): C, 59.23; H, 7.16; N, 5.53; mol. weight 1014.0. Found (percent): C, 59.53; H, 6.96; N, 5.86; mol. weight 937.

EXAMPLE 16

One proceeds as in Example 3. After having completely removed the xylene using high vacuum, the waxy-like crystals are dissolved in hexane, insoluble hexaphenyldisiloxane is filtered off, the filtrate is strongly concentrated and the compound is recrystallized in light petroleum ether (B.P. 30–45° C.). There are obtained from 18.4 g. (0.025 ml) of 1,3-bis-(3-dimethylchlorosilyl-2',2',4',4'-tetramethyl - 1',3',2',4' - diazadisiletidino - dimethylsilyl)-2,2,4,4-tetramethyl-1,3,2,4-diazadisiletidine and 14.9 g. (0.05 mol) of sodium triphenylsilanolate 26.9 g. (89%) of 1,3 - bis - (3'-triphenylsiloxy - dimethylsilyl - 2',2',4',4'-tetramethyl - 1',3',2',4' - diazadisiletidino - dimethylsilyl)-2,2,4,4 - tetramethyl - 1,3,2,4 - diazadisiletidine; M.P. 160° C.

*Analysis.*—Cal'd for $C_{56}H_{90}O_2N_6Si_{12}$ (percent): C, 55.26; H, 7.45; N, 6.90; mol. weight 1217.1. Found (percent): C, 55.07; H, 7.18; N, 6.89; mol. weight 1193.

EXAMPLE 17

1,3 - bis - (dimethyl-phthalimido-silyl) - 2,2,4,4 - tetramethyl-1,3,2,4-diazadisiletidine is obtained by boiling a solution of 20.2 g. (0.05 mol) of 1,3-bis-(dimethylamino-dimethylsilyl) - 2,2,4,4 - tetramethyl - 1,3,2,4 - diazadisiletidine with 14.7 g. (0.1 mol) of phthalimide in 100 ml. of xylene for 3 to 4 hours. The replacement is 97%. After removal of the xylene, the remaining pale yellow crystals are recrystallized from hexane. Yield 26.7 g. (95.5%), M.P. 148° C.

EXAMPLE 18

12.0 g. (0.025 mole) of 1,3-bis-(3-chlorotetramethyldisiloxanyl) - 2,2,4,4 - tetramethyl - 1,3,2,4-diazadisiletidine and 11.8 g. (0.05 mole) of sodium methyldiphenylsilanolate in 40 ml. of xylene are boiled for 4 hours. NaCl is filtered off and the solvent distilled off at normal pressure. The residue is fractionally distilled. Yield 14.2 g. (68%) of 1,3 - bis-(5,5-diphenylpentamethyltrisiloxanyl)-2,2,4,4-tetramethyl-1,2,3,4-diazadisiletidine; B.P. 230° C./0.005 mm., M.P. 26° C.; $n_D^{20}$ 1.5091.

*Analysis.*—Calc'd for $C_{38}H_{62}O_4N_2Si_8$ (835.65) (percent): C, 54.62; H, 7.48; N, 3.35. Found (percent): C, 54.62; H, 7.33; N, 3.54.

EXAMPLE 19

12.6 g. (0.02 mole) of 1,3-bis-(5-chlorohexamethyltrisiloxanyl)-2,2,4,4-tetramethyl-1,3,2,4-diazadisiletidine and 9.4 g. (0.04 mole) of sodium methyldiphenylsilanolate are reacted as in Example 18. Yield 9.7 g. (49%) of 1,3- bis-(7,7-diphenylheptamethyltetrasiloxanyl)-2,2,4,4-tetramethyl-1,3,2,4-diazadisiletidine; 246° C./0.005 mm., M.P. 1–3° C., $n_D^{20}$ 1.4925.

*Analysis.*—Calc'd for $C_{42}H_{74}N_2O_6Si_{10}$ (984.0) (percent): C, 51.27; H, 7.58; N, 2.85. Found (percent): C, 51.43; H, 7.54; N, 2.97.

EXAMPLE 20

7.7 g. (0.01 mole) of 1,3-bis-(7-chlorooctamethyltetrasiloxanyl)-2,2,4,4-tetramethyl-1,3,2,4-diazadisiletidine and 4.7 g. (0.02 mole) of sodium methyldiphenylsilanolate are reacted as in Example 18. Yield 6.1 g. (45%) of 1,3-bisments about 15 to 20 g. of compounds a, b, e, f, i and j of methyl-1,3,2,4-diazadisiletidine; B.P. 257/0.005 mm, $n_D^{20}$ 1.4808.

*Analysis.*—Calc'd $C_{46}H_{86}N_2O_8Si_{12}$ (1132.3) (percent): C, 48.79; H, 7.66; N, 2.47. Found (percent): C, 48.91; H, 7.94; N, 2.02.

EXAMPLE 21

The following experiments were carried out in a similar manner to Example 7 as follows: In separate experiments about 15 to 20 g. of compounds a, b, e, f, i, and j of Table 1 which follows are stirred for 6 days at room temperature with five times the the amount of $CH_3MgBr$ required for full methylation, the excess of Grignard reagent is inactivated with trimethylchlorosilane, and solvent, trimethylchlorosilane and tetramethylsilane are completely distilled in high vacuum. The residue in the flask is introduced gradually into a mixture of water/cyclohexane (1:1) and the methylated compounds c, d, g, h, k and l, respectively, are shaken with cyclohexane. After the solvent has been removed, they are recrystallized from cyclohexane (k and l), hexane (h) or low boiling petroleum ether (c and g). The yields in all cases are between 85 and 93%.

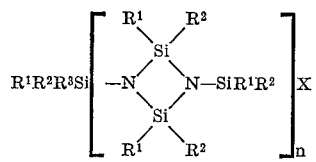

in which $R^1$, $R^2$ and $R^3$, when taken singly, signify similar or different hydrocarbon groups, heterocyclic groups or silyl groups of up to 12 atoms, which can also be linked through an oxygen atom and the silyl groups, moreover, can also be linked through a nitrogen atom, $R^1$ and $R^2$, moreover, signify hydrogen atoms or fluorine atoms, $R^1$ and $R^2$, taken together with their silicon atom, can form a heterocyclic ring, $n$ is an integer of 1 to 100 and X is as defined hereinbelow, comprising reacting a compound of the general formula

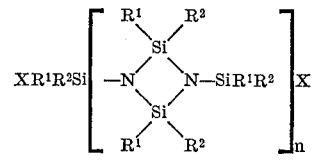

in which $R^1$, $R^2$ and $n$ are defined as above and X signifies a reactive halogen atom, an $H_2N$ group, or a secondary or tertiary amino group derived from an amine which is more volatile than the hydroxyl compound or aminosilane compound, respectively, to be reacted in the amine exchange process, and a compound of the general formula TABLE 1.—PHYSICAL DATA AND ANALYSES[1] OF THE COMPOUNDS a–l

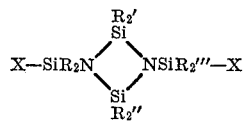

| Comp. No. | X | R | R' | R'' | R''' | B.P./mm. Hg | M.P., deg. | Empirical formula | Mol. weight[2] | C, percent | H, percent | N, percent | Cl, percent |
|---|---|---|---|---|---|---|---|---|---|---|---|---|---|
| a | Cl | CH₃ | Ph | CH₃ | CH₃ | 134°/0.005 | 73 | $C_{18}H_{28}Cl_2N_2Si_4$ | Calc.: 455.7 | 47.44 | 6.19 | 6.15 | 15.56 |
|   |    |     |    |     |     |            |    |                           | Found: 438    | 47.58 | 6.12 | 6.04 | 15.34 |
| b | Cl | Ph | CH₃ | CH₃ | CH₃ | 144°/0.005 | 41 |                           | Found: 447    | 47.04 | 6.27 | 6.09 | 15.42 |
| c | CH₃ | CH₃ | Ph | CH₃ | CH₃ | 120°/0.03 | 51 | $C_{20}H_{34}N_2Si_4$ | Calc.: 414.8 | 57.90 | 8.26 | 6.75 |  |
|   |     |     |    |     |     |           |    |                       | Found: 405   | 57.82 | 8.25 | 6.66 |  |
| d | CH₃ | Ph | CH₃ | CH₃ | CH₃ | 124°/0.005 | (³) |                      | Found: 411   | 57.75 | 8.22 | 6.71 |  |
| e | Cl | Ph | Ph | CH₃ | CH₃ | 218°/0.05 | (⁴) | $C_{28}H_{32}Cl_2N_2Si_4$ | Calc.: 579.9 | 57.58 | 5.56 | 4.83 | 12.23 |
|   |    |    |    |     |     |           |    |                           | Found: 548   | 58.06 | 5.64 | 5.10 | 12.34 |
| f | Cl | Ph | CH₃ | CH₃ | Ph | 218°/0.05 | 139 |                       | Found: 556   | 57.68 | 5.32 | 4.98 | 11.91 |
| g | CH₃ | Ph | Ph | CH₃ | CH₃ |           | 97 | $C_{30}H_{38}N_2Si_4$ | Calc.: 539.0 | 66.85 | 7.11 | 5.20 |  |
|   |     |    |    |     |     |           |    |                       | Found: 525   | 66.71 | 7.13 | 5.20 |  |
| h | CH₃ | Ph | CH₃ | CH₃ | Ph |            | 144 |                      | Found: 527   | 66.82 | 7.05 | 5.17 |  |
| i | Cl | Ph | Ph | CH₃ | Ph | 282°/0.05 | 106 | $C_{33}H_{36}Cl_2N_2Si_4$ | Calc.: 704.0 | 64.83 | 5.15 | 3.98 | 10.07 |
|   |    |    |    |     |    |           |     |                           | Found: 698   | 64.64 | 5.04 | 3.78 | 10.07 |
| j | Cl | Ph | Ph | Ph | CH₃ | 282°/0.05 | 283 |                       | Found: 681   | 65.17 | 5.11 | 3.98 | 10.3 |
| k | CH₃ | Ph | Ph | CH₃ | Ph |           | 150 | $C_{40}H_{42}N_2Si_4$ | Calc.: 663.2 | 72.45 | 6.38 | 4.22 |  |
|   |     |    |    |     |    |           |     |                       | Found: 651   | 72.51 | 6.38 | 4.17 |  |
| l | CH₃ | Ph | Ph | Ph | CH₃ |           | 215 |                       | Found: 648   | 72.55 | 6.45 | 4.24 |  |

[1] Carried out in a microanalytical laboratory.
[2] Cryoscopically in benzene.
[3] $n_D^{20}$ 1.5210.
[4] $n_D^{20}$ 1.5863.

What is claimed is:

1. A process for preparing 1,3-bis-disilyl-1,3,2,4-diazadisiletidines of the general formula

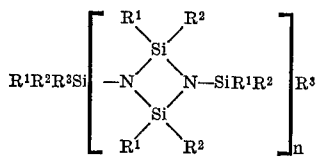

$MR^3$ in which $R^3$ is defined as above and M is an alkali metal atom or MgX in the halogen exchange process, or a hydrogen atom linked via an oxygen atom or nitrogen atom in the amine exchange process, until no more substantial quantity of alkali halide or magnesium halide or ammonia or amine, respectively, is formed.

2. A process of claim 1 wherein $R^1$ and $R^2$ are hydrocarbon groups of up to 12 carbons, $R^3$ is an

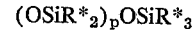

group wherein R* is a hydrocarbon group, $p$ is an integer of 0 to 10 and M is an alkali metal atom.

3. A process of claim 1 wherein $R^1$, $R^2$ and $R^3$ are hydrocarbon groups of up to 12 carbons and M is an alkali metal atom.

4. A process of claim 1 wherein $R^1$, $R^2$ and $R^3$ are hydrocarbon groups of up to 12 carbons and M is an MgX group.

5. A process of claim 1 wherein $R^1$ and $R^2$ are methyl groups, R is a phthalimido group, X is dimethylamino and M is a hydrogen atom.

6. A product of the formula

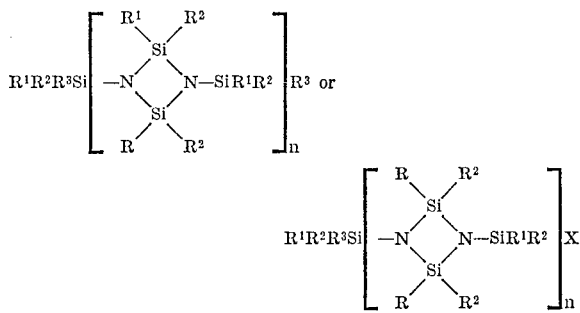

in which $R^1$, $R^2$ and $R^3$, when taken singly, signify similar or different hydrocarbon groups, heterocyclic groups or silyl groups of up to 12 atoms, which can also be linked through an oxygen atom and the silyl groups, moreover, can also be linked through a nitrogen atom, $R^1$ and $R^2$, moreover, signify hydrogen atoms or fluorine atoms, $R^1$ and $R^2$, taken together with their silicon atom, can form a heterocyclic ring, $n$ is an integer of 2 to 100, and X is a reactive halogen atom, an $NH_2$ group or, a secondary or tertiary amino group.

7. A product of claim 6 of the first formula wherein $R^1$, $R^2$ and $R^3$ are hydrocarbon groups of up to 12 carbons.

8. A product of claim 7 wherein $R^1$, $R^2$ and $R^3$ are methyl and $n$ is 2.

9. A product of claim 7 wherein $R^1$, $R^2$ and $R^3$ are methyl and $n$ is 3.

10. A product of claim 7 wherein $R^1$ and $R^2$ are methyl, $R^3$ is phenyl and $n$ is 2.

11. A product of claim 7 wherein $R^1$ and $R^2$ are methyl, $R^3$ is phenyl and $n$ is 3.

12. A product of claim 6 of the second formula wherein $R^1$, $R^2$ and $R^3$ are hydrocarbon groups of up to 12 carbons and X is a reactive halogen atom.

13. A product of claim 12 wherein $R^1$, $R^2$ and $R^3$ are hydrocarbon groups of up to 12 carbons, X is a chlorine atom and $n$ is 2.

14. A product of claim 6 of the first formula wherein $R^1$ and $R^2$ are hydrocarbon groups of up to 12 carbons and $R^3$ is an $(OSiR^*_2)_p OSiR^*_3$ group wherein $R^*$ is a 1 to 5 alkyl or phenyl group and $p$ is an integer from 0 to 10.

15. A product of claim 14 wherein $R^1$, $R^2$ and $R^*$ are methyl and $p$ is 2.

16. A product of claim 14 wherein $R^1$, $R^2$ and $R^*$ are methyl and $p$ is 3.

17. A product of claim 14 wherein $R^1$ and $R^2$ are methyl, one $R^*$ is methyl, the other two $R^*$'s are phenyl and $p$ is 2.

18. A product of claim 14 wherein $R^1$ and $R^2$ are methyl, $R^*$ is phenyl and $p$ is 2.

19. A product of claim 14 wherein $R^1$ and $R^2$ are methyl, $R^*$ is phenyl and $p$ is 3.

References Cited

UNITED STATES PATENTS

| | | | |
|---|---|---|---|
| 3,098,830 | 7/1963 | Rochon | 260—448.2 XR |
| 3,140,288 | 7/1964 | Peake | 260—448.2 XR |
| 3,146,250 | 8/1964 | Speier | 260—448.2 |
| 3,159,668 | 12/1964 | Rochon | 260 448.2 |
| 3,170,941 | 2/1965 | Speier | 260—448.2 |
| 3,291,760 | 12/1966 | Bayer | 260—448.2 XR |
| 3,297,592 | 1/1967 | Fink | 260—448.2 |
| 3,393,218 | 7/1968 | Van Wazer et al. | 260—448.2 |

TOBIAS E. LEVOW, Primary Examiner

W. F. W. BELLAMY, Assistant Examiner

U.S. Cl. X.R.

260—46.5, 448.2; 252—49.6